(12) United States Patent
Roy et al.

(10) Patent No.: US 11,026,512 B2
(45) Date of Patent: Jun. 8, 2021

(54) METHOD FOR SELLING MOTION-ACTUATED SEATS IN MOVIE THEATERS

(75) Inventors: Philippe Roy, St-Bruno (CA); Bruno Paillard, Sherbrooke (CA)

(73) Assignee: D-BOX TECHNOLOGIES INC.

( * ) Notice: Subject to any disclaimer, the term of this patent is extended or adjusted under 35 U.S.C. 154(b) by 1404 days.

(21) Appl. No.: 11/557,507

(22) Filed: Nov. 8, 2006

(65) Prior Publication Data

US 2008/0109265 A1 May 8, 2008

(51) Int. Cl.
*A47C 1/12* (2006.01)
*G06Q 10/02* (2012.01)

(52) U.S. Cl.
CPC .............. *A47C 1/12* (2013.01); *G06Q 10/02* (2013.01)

(58) Field of Classification Search
USPC ....... 705/1, 1.1, 500; 297/181, 217.3, 260.1; 434/30; 472/136
See application file for complete search history.

(56) References Cited

U.S. PATENT DOCUMENTS

| | | | | |
|---|---|---|---|---|
| 3,628,829 A * | 12/1971 | Heilig | | 297/217.4 |
| 3,865,430 A * | 2/1975 | Tanus | | 297/330 |
| 4,752,065 A * | 6/1988 | Trumbull etal. | | 472/60 |
| 5,015,933 A * | 5/1991 | Watkins et al. | | 318/567 |
| 5,678,889 A * | 10/1997 | Purcell, Jr. | | 297/257 |
| 5,822,928 A * | 10/1998 | Maxwell et al. | | 52/8 |
| 6,585,515 B1 * | 7/2003 | Roy et al. | | 434/55 |
| 8,827,709 B1 * | 9/2014 | Gurule | | G09B 9/12 434/45 |
| 2003/0113094 A1 * | 6/2003 | Tewksbury | | H04N 5/775 386/230 |
| 2004/0004376 A1 * | 1/2004 | Cabebe | | 297/217.1 |
| 2004/0229192 A1 | 11/2004 | Roy et al. | | |
| 2009/0205908 A1 * | 8/2009 | Hammonds | | B64F 1/22 187/222 |

OTHER PUBLICATIONS

Smith, Ja'Rena, Movie theaters not just pushing popcorn to add to the viewers' experiences, Knight Ridder Tribune Business News. Washington, p. 1, Jun. 23, 2004.*
Harrington, John, Proposal for $1 theater wins teen a scholarship, Knight Ridder Tribune Business News, p. 1, Washington, Apr. 25, 2006.*
BusinessWire, Ultimate Game Chair Introduces The Most Luxurious and Exciting Gaming Experience, Business Wire, New York, p. 1, May 12, 2004.*
U.S. Appl. No. 11/289,352, filed Nov. 30, 2005, Orban et al.

* cited by examiner

*Primary Examiner* — Jan P Mincarelli
(74) *Attorney, Agent, or Firm* — Norton Rose Fulbright Canada LLP

(57) ABSTRACT

A method for selling seats in a movie theater, comprising the steps of: providing a first screening room in a movie theater with actuated seats providing movement in synchronization with a motion picture having a feature-length presentation being projected; selling access to non-actuated seats in the movie theater at a base price per seat; selling access to said actuated seats in said first screening room at a second price per seat, the second price being equal to the base price per seat added to an actuated-seat premium; controlling the access to said actuated seats in said first screening room as opposed to the non-actuated seats; and projecting said motion picture in the first screening room with the actuated seats being actuated to provide movement in synchronization with the motion picture.

19 Claims, 4 Drawing Sheets

METHOD FOR SELLING MOTION-ACTUATED SEATS IN MOVIE THEATERS

BACKGROUND OF THE INVENTION

1. Field of the Invention

The present invention relates to movie theater entertainment and, more particularly, to a method for selling seats in movie theaters combined with the use of actuated seats.

2. Background Art

Movie theater attendance has failed to grow in recent years—in fact, in many countries, movie theater attendance has declined.

Various factors have been identified to explain this decline, but one major industry has particularly affected sales of movie tickets: home entertainment. It is no longer necessary to go to movie theaters to be surrounded by decibels of stereo sound, with wide-screen visuals, and buttery popcorn. Home theater systems equipped with large television screens and DVD players equal, if not surpass, the movie-watching experience offered by theaters. That is without considering the various annoyances associated with movie theaters: people talking during movies, bad seats for latecomers, commercials before the movies, etc. Moreover, one night of home theater is cheaper than a night at the movie theater, when comparing ticket/rental prices, food and drinks, babysitting expenses, parking, etc.

Due to the ever-increasing copyright royalties associated with screening movies, movie theaters have evolved to generate other types of revenue. A greater variety of food products and drinks are now offered in movie theaters. Supplemental types of entertainment are provided in theaters, such as arcades and like video games, etc. Restaurant-style rooms and coffee shops are also a part of movie theaters.

Additionally, movie theaters have improved seating arrangements, by way of stadium-like seating for unobstructed visibility of the screen, and bucket seats with food racks. Despite all these improvements and services, home entertainment remains very appealing, whereby other solutions are desired to increase the appeal of movie theaters.

SUMMARY OF INVENTION

It is therefore an aim of the present invention to provide a method for selling seats in a movie theater that addresses issues associated with the prior art.

It is a further aim of the present invention to provide a screening room of a movie theater that addresses issues associated with the prior art.

Therefore, in accordance with the present invention, there is provided a method for selling seats in a movie theater, comprising the steps of: providing a first screening room in a movie theater with actuated seats providing movement in synchronization with a motion picture having a feature-length presentation being projected; selling access to non-actuated seats in the movie theater at a base price per seat; selling access to said actuated seats in said first screening room at a second price per seat, the second price being equal to the base price per seat added to an actuated-seat premium; controlling the access to said actuated seats in said first screening room as opposed to the non-actuated seats; and projecting said motion picture in the first screening room with the actuated seats being actuated to provide movement in synchronization with the motion picture.

Further in accordance with the present invention, there is provided a screening room of a feature-length movie theater comprising: a projection system; a screen; non-actuated seats disposed so as to face a screen; actuated seats disposed so as to face the screen, the actuated seats providing movement; and a motion simulation system connected to the actuated seats and interfaced to the projection system so as to send continuous streams of motion signals to the actuated seats in synchronization with a feature-length motion picture being projected on the screen, so as to provide movement to the actuated seats in synchronization with the feature-length motion picture.

Still further in accordance with the present invention, there is provided a method for selling seats in a movie theater, comprising the steps of: providing a first screening room in a movie theater with actuated seats providing movement in synchronization with video images of a sporting event being projected; selling access to said actuated seats; controlling the access to said actuated seats as opposed to the non-actuated seats; and projecting said sporting event in the first screening room with the actuated seats being actuated to provide movement in synchronization with the video images of the sporting event.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
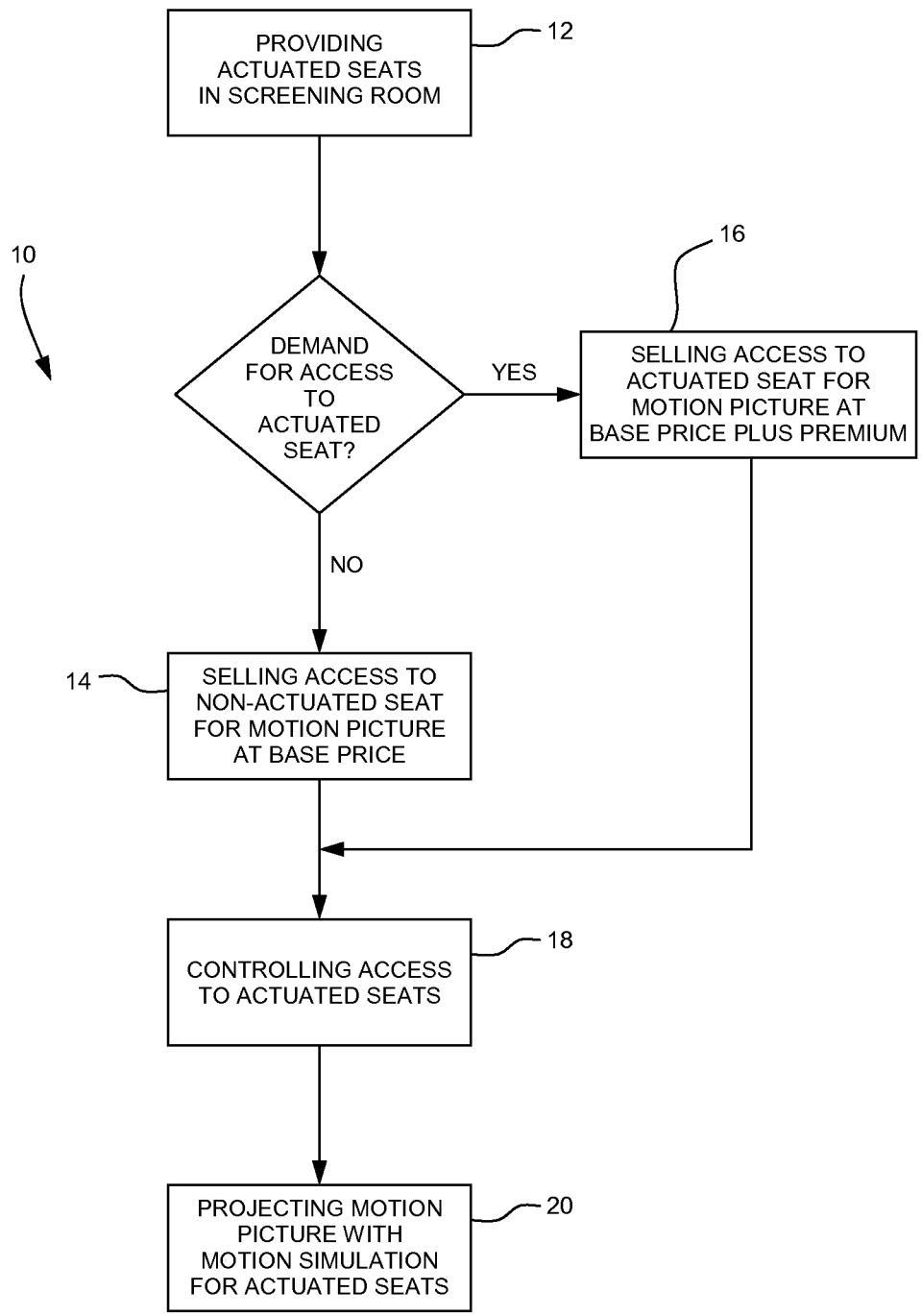
FIG. 1 is a flowchart depicting a method for selling seats in a movie theater in accordance with an embodiment of the present invention.

Referring now to the drawings, and more particularly to FIG. 1, a method for selling seats in a movie theater in accordance with a preferred embodiment is generally shown at 10. The method 10 involves the use of actuated seats in screening rooms of movie theaters for feature-length presentations. The present assignee has developed such actuated seats and related technology, as described in U.S. Publication No. 2004/0229192, Nov. 18, 2004, by Roy et al., U.S. patent application Ser. No. 11/289,352, filed on Nov. 30, 2005, by Orban et al., PCT Application No. CA2006/000683, filed on Apr. 26, 2006 by Roy et al., and PCT Application No. CA2006/000682, filed on Apr. 26, 2006 by Roy et al., all of which are incorporated herein by reference.

Figure 3:
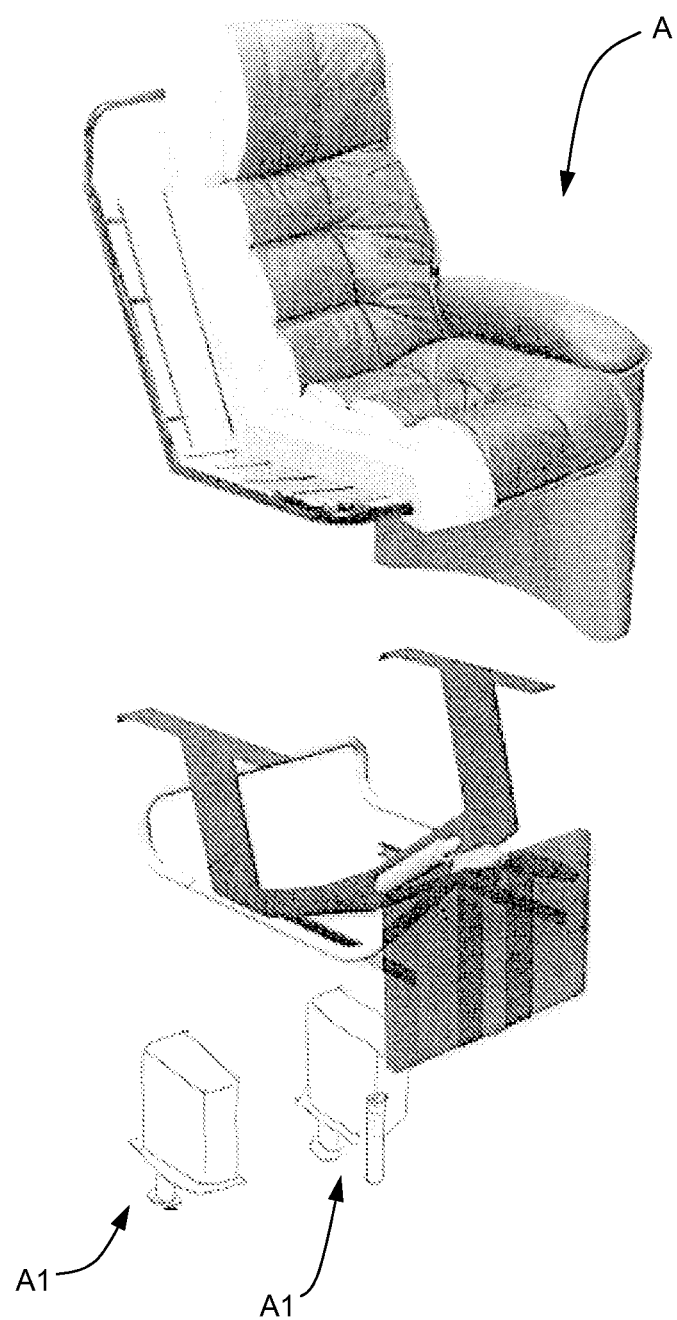
FIG. 3 is a perspective view of an actuated seat as used in the method of FIG. 1.

Referring to FIG. 3, one such actuated seat is illustrated at A, and corresponds to the seats shown in FIGS. 6 and 8 of U.S. Publication No. 2004/0229192, featuring electrically-actuated linear actuators. The seat A has actuators A1 that receive motion data signals (also referred to as continuous streams of motion codes) to move in synchronization with action taking place in the motion picture. Therefore, as the motion picture is projected on screen in the screening room, actuation signals are sent to the seats, in such a way that the seats move in synchronization with the images appearing on screen.

The seat A alternatively has other features, such as an incline adjustment mechanism with or without a footrest, and a vertically adjustable headrest.

Figure 4:
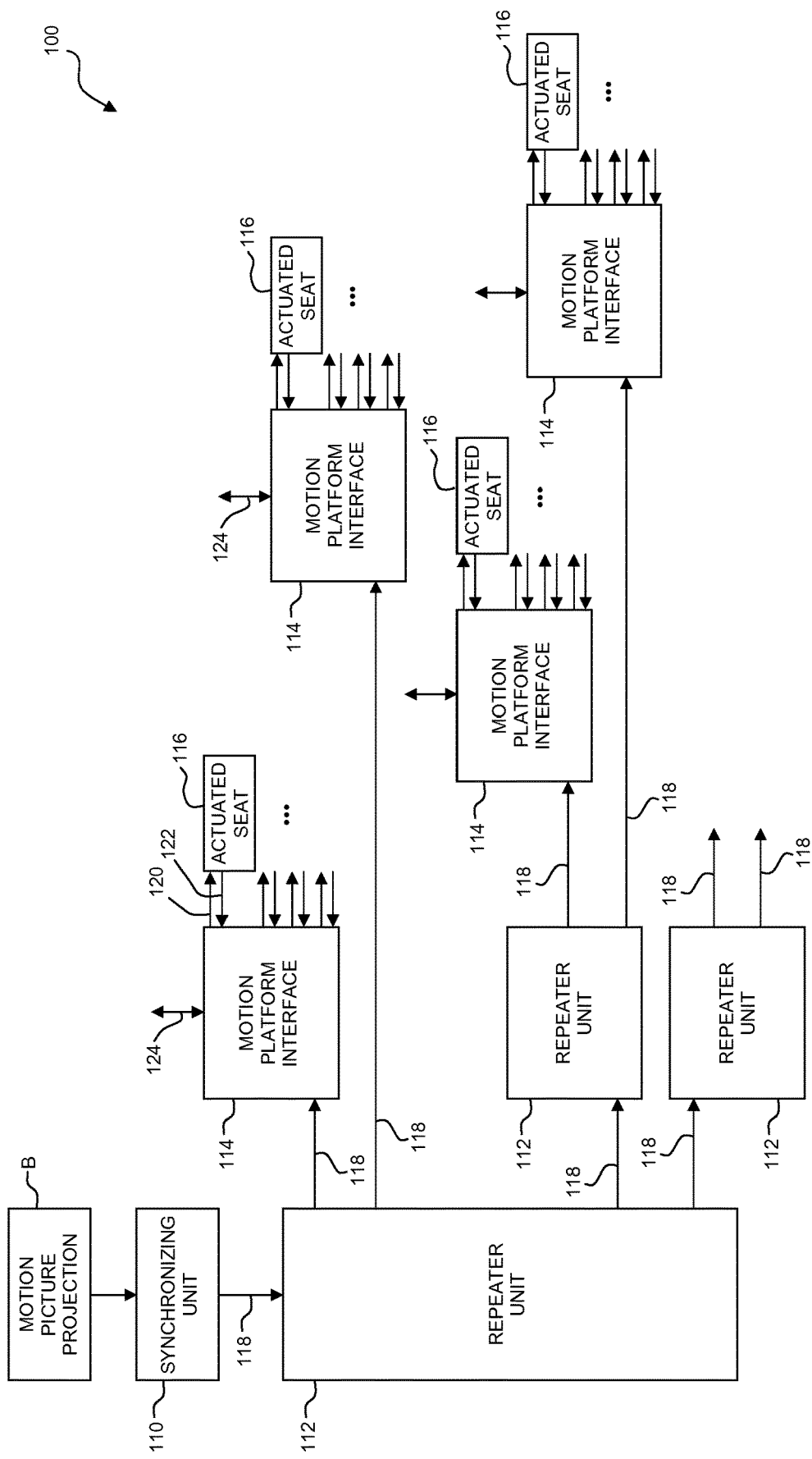
FIG. 4 is a block diagram of a system for providing motion control signals in synchronization with a motion picture as used with the method of FIG. 1.

Step 12 of the method 10 involves providing actuated seats, such as the actuated seat of FIG. 3, in the screening room. This step includes providing the necessary motion simulation system as illustrated in FIG. 4 and described hereinafter, for the actuated seats A to receive actuation signals synchronized with the motion picture.

Various configurations are considered for introducing and installing the actuated seats in screening rooms. Some screening rooms can have only a part of the seats equipped with motion simulator actuators. In this case, it is considered to regroup the seats in a given section of the screening room, so as to facilitate the control of the access to these seats if such access is verified by an usher.

Different categories of actuated seats can be mounted in the screening room. For instance, the actuated seat A is illustrated as being a one-person seat, and can fall within a first category of actuated seats. Two-person actuated seats can be used as well, which seats fall within a second category of actuated seats. The actuated seats may be actuated to move along two, three or more degrees of freedom (i.e., one, two, three or more axes of actuation).

It is considered to provide each actuated seat with a user interface to control the access to the seats. The user interface may take various forms, such as a barcode reader, a keypad, etc. The interface can be used by the user to enter data associated with the motion simulation. For instance, the intensity level of the motion simulation can be entered using the user interface, such that the intensity of each seat is controlled independently from the others. Similarly, user identification (height, weight) can be entered as well for the automatic adjustment of the actuated seat A (height of heat rest, incline adjustment).

The motion simulation is preferred for feature-length motion pictures of the action type, although dramas, romances, and the like may have action sequences for which simulation may be worth providing. Accordingly, it is considered to provide multiplex movie theaters with only a few screening rooms with actuated seats.

Steps 14 and 16 address the issue of pricing for actuated seats as opposed to non-actuated seats. As a general practice, movie theaters charge general admission for regular seats, with different rates for senior citizens and students and/or children. In specific cases, two levels of pricing can be offered in general admission. For instance, seats in rooms offering IMAX™ projections are often sold at a general admission price higher than other normal projections in the same movie theater.

Considering that the actuated seats represent a superior level of entertainment, access to actuated seats is to be sold at a price that is, in specific instances such as the limited distribution period of the motion picture, higher than general admission. As a general rule, general admission allows access to a non-actuated seat at a base price. Access to actuated seats is sold at a different price equal to the base price added to a premium.

Figure 2:
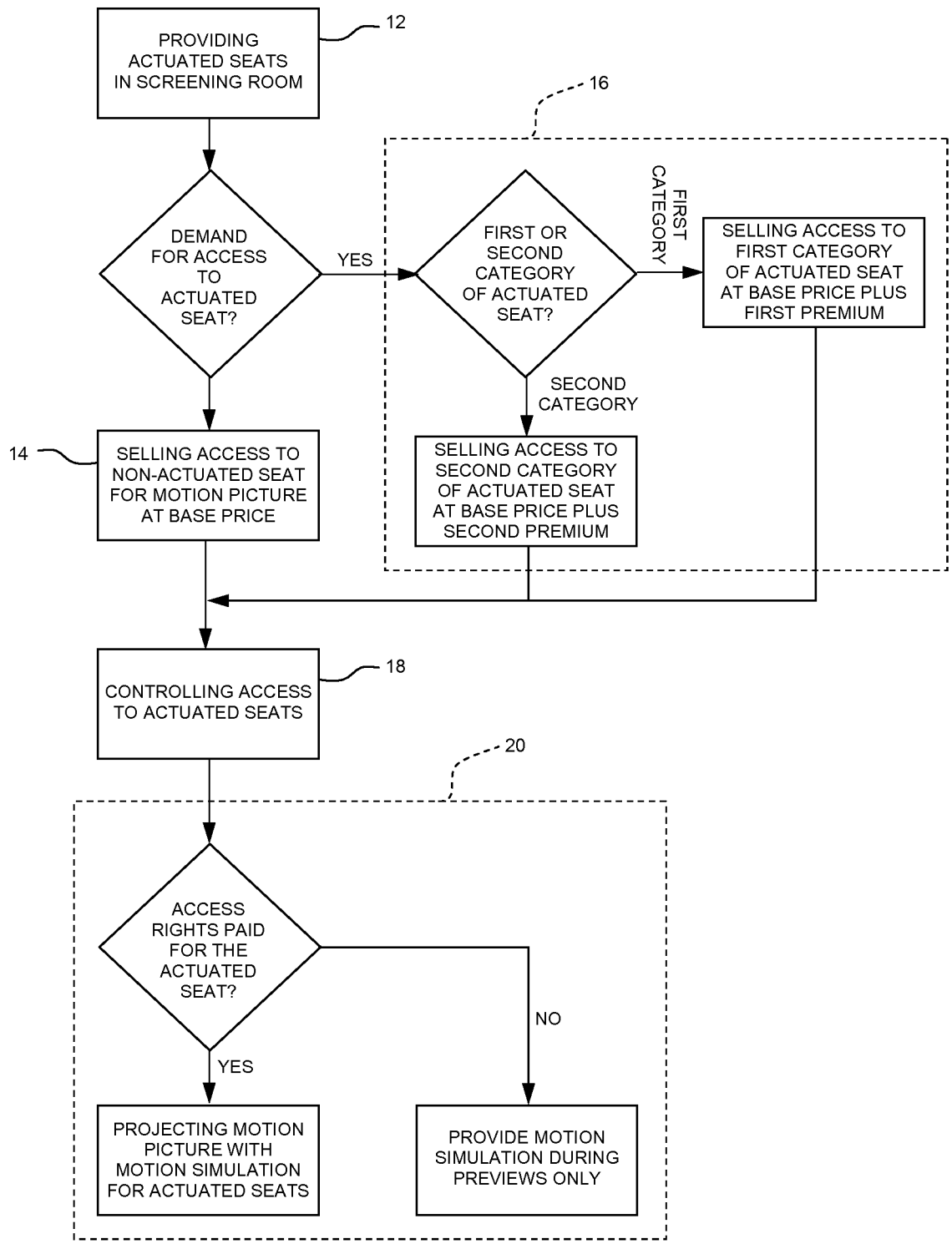
FIG. 2 is a flowchart depicting the method of FIG. 1, with optional embodiments for the sale of access rights and the projection of the motion picture.

As seen in FIG. 2, it is suggested to sell two different categories of actuated seats at two different prices. For instance, it is considered to sell access rights to a two-person seat at a same price or different price per person than a single-person seat, or vice-versa.

In Step 18, access to the actuated seats is controlled. As members of the audience have selected actuated seats for the motion picture, the access to the actuated seats must be controlled to justify the price with premium of the actuated seats. If a screening room has all of its seats actuated, and access to this screening room is only sold at the price with premium, it is preferred to control access to the screening room at the entrance of the screening room, such that people having purchased tickets at the base price for non-actuated seats for another picture cannot access the screening room with actuated seats. If only a portion of the screening room is equipped with actuated seats, an usher service is provided to control access to the actuated seats. In such a case, if the actuated seats are regrouped in a given zone of the screening room, it is suggested to identify the zone of actuated seats with visual markers or barriers. Moreover, the ushers can service the room with regard to how the seats operate, and attend to questions by audience members.

If the actuated seats are equipped with a user interface, access to the actuated seats is controlled by giving an access code to the purchaser of the access to the seat. It is suggested to give the access code on the ticket. The access code takes the form of an alphabetic, numeric or alphanumeric code, or may be another type of code such as barcode to be read by an appropriate reader. The access is therefore controlled at the actuated seat.

In Step 20, the motion picture is projected in the screening room. Therefore, actuated seats receive actuation signals in synchronization with the motion picture so as to simulate movement in accordance with the action of the motion picture. In the screening of a motion picture, advertisements and previews are presented prior to the feature presentation. It is therefore suggested to use the motion simulation during previews of action films, and during advertisement. For instance, action-image advertisement (e.g., the commercial for a vehicle such as an SUV) can be combined with motion simulation of the actuated seats. Moreover, the screening room may be used to present live events, such as sporting events, with motion simulation for the actuated seats. As an example, race car events can be projected in movie theaters with motion simulation of actuated seats as a function of the live racing images (e.g., from a driver cam).

In the embodiment in which access is controlled at the actuated seat, it is suggested to actuate all actuated seats during the preview period, including seats for which access rights have not been paid. Therefore, as shown in FIG. 2, once the feature-length presentation begins, actuation signals become restricted to the actuated seats for which access rights have been paid. As such, both the previewed motion picture and the motion simulation by actuated seats are promoted.

In the movie industry, feature-length films are often distributed according to a similar pattern. According to this pattern of distribution, motion pictures are firstly distributed to movie theaters in given geographical regions, in what is referred to as the limited distribution period, or blackout period. At the end of the limited distribution period, the motion picture is sequentially released for PayPerView viewing for home entertainment, for rental in video stores and for sale as DVD or videocassette. Later, the movie rights are available for public broadcasting.

When the feature-length motion picture is in the limited distribution period, the premium for actuated seats is justified by the demand for access to the motion picture that is exclusive to movie theaters. Mainstream movie theaters seldom project motion pictures after their limited distribution period has expired, as the home entertainment possibility is offered to consumers. However, it is suggested to have movie theaters project motion pictures with motion simulation out of the limited distribution period.

As the motion simulation systems are currently present in only a small percentage of households, there is a form of exclusivity for motion pictures with motion simulation. Therefore, it is suggested to project motion pictures with motion simulation outside of the limited distribution period. Classic action pictures can also be projected with motion simulation by movie theaters. In these cases, it is considered to have a null premium, such that access to movies with motion simulation is at the price of general admission.

In an embodiment, a few of the screening rooms are provided with actuated seats only, whereas all other rooms are provided with non-actuated seats. Therefore, access to the screening rooms with the actuated seats is more easily controlled if some screening rooms are exclusively provided with actuated seats.

As an example of a motion simulation system well suited for use with the method 10, reference is made to FIG. 4. In FIG. 4, there is shown an embodiment of a system 100 for providing motion control signals that are synchronized with a sequence of images from a motion picture B to a plurality of actuated seats 116. According to the illustrated embodiment, the system 100 is a distribution network arranged in a tiered-star configuration and comprises a plurality of repeater units 112, each splitting a motion data signal 118 to a plurality of motion platform interfaces 114 and/or to other repeater units 112. The system 100 comprises a synchronizing unit 110, repeater units 112 and motion platform interfaces 114, each for controlling a plurality of actuated seats 116.

The synchronizing unit 110 provides a motion data signal 118 that is synchronized with the sequence of images. For instance, the synchronizing can be done by matching recorded motion samples with the audio track associated with the sequence of images. The audio track is input to the synchronizing unit 110 which recognizes an audio sample and synchronously matches it with the corresponding motion sample in a lookup table. The synchronization between the audio track and the recorded motion samples is given as an example—it is contemplated to synchronize the motion signals with other parts of the motion picture package, or to have the recorded motion samples as part of the motion picture package (e.g., particularly suited for digital cinema).

The synchronized motion data signal 118 is provided to the repeater units 112 which splits and synchronously forwards the received motion data signal 118 to at least one unit which may be another repeater unit 112 and/or a motion platform interface 114.

In this embodiment, each motion platform interface 114 controls and manages a subgroup of up to four actuated seats 116. The motion platform interface 114 synchronously provides the motion samples contained in the motion data signal 118 to each actuated seat 116 along with control data in the control signal 120.

It will be further appreciated that a return signal 122 is provided by each of the actuated seats 116 to its corresponding motion platform interface 114. The return signal 122 provided by the actuated seats 116 may be used by a corresponding motion platform interface 114 for management or maintenance purposes by, for example, access control, monitoring specific operating parameters of the motion platform such as the temperature of the actuators used, the weights, or fault information data.

For example, if communication is lost with one actuator of an actuated seat 116 or if a failure of one actuated seat 116 is detected during the motion playback, the motion platform interface parks or freezes the actuated seat 116 using control signal 122, to avoid a situation where the platform is not properly supported. Under given circumstances (when failure is due to high temperature of an actuator for example), the motion platform interface 114 may resume the motion control of a platform 116 that has failed after a given period of time.

Each motion platform interface 114 also includes a maintenance port 124 for testing and programming in production and installation of the system and for communicating on-site monitoring data from the actuated seat 16 connected to the motion platform interface 114. Such data may include operating parameters of the actuated seats 116 such as access control, temperature of the actuators used, weights, or fault information data. The maintenance port 124 may be provided, for instance, in the form of a USB connection. For maintenance purposes, for example, a PC may be momentarily connected to the maintenance port 124.

In fact, the management of a given actuated seat 116 is handled by a corresponding motion platform interface 114 to which a subgroup of actuated seats 116 including the given platform is connected. The management of the actuated seats 116 being decentralized, the operation of the plurality of actuated seats 116 is not dependent on the operation of the actuated seats 116 pertaining to another subgroup, which is of great advantage for maintaining a synchronization, especially in the case of a malfunction of a given actuated seat 116. The synchronization aspect is advantageously centrally handled by the synchronizing unit 110 and the synchronous providing of the motion data signal 118 by the repeater unit 112 to the motion platform interface 114.

The invention claimed is:

1. A method for operating seats in a movie theater, the seats being actuatable to provide movement in synchronization with a motion picture having a feature-length presentation, comprising the steps of:
    operating a control interface centrally controlling a plurality of the actuated seats individually;
    centrally receiving access data confirming that access is sold for a portion of said seats in said first screening room at a base price per seat added to an actuated-seat premium;
    selectively actuating only said portion of said seats in said first screening room from said access data with centrally-sent motion signals while said motion picture is projected in the first screening room, the centrally-sent motion signals causing only said actuated portion of said seats to be individually actuated by electrically-operated linear actuators connected directly to the actuated seats to provide movement in synchronization with the motion picture;
    selectively non-actuating a remainder of said seats with said centrally-sent motion signals while said motion picture is projected based on said centrally received access data; and
    centrally receiving management signals from any individual one of the actuated seats on the control interface to confirm actuation of said portion of said seats, the management signals including fault information data issued by the individual one of the actuated seat.

2. The method according to claim 1, comprising providing first and second categories of actuated seats in the first screening room, the actuated seats of the first category being one-person seats and the actuated seats of the second category being seats for at least two persons.

3. The method according to claim 2, wherein receiving access data for said actuated seats involves receiving access data for the first category or the second category of actuated seats.

4. The method according to claim 1, wherein projecting the motion picture is performed out of the limited distribution period for said motion picture.

5. The method according to claim 1, wherein selectively actuating the seats comprises actuating the actuated seats by a continuous stream of motion signals.

6. A screening room and projection room of a feature-length movie theater comprising:
a projection system in the projection room;
a screen in the screening room;
seats disposed so as to face the screen, the seats providing movement;
a control interface for receiving access data identifying a portion of seats for which access is sold, and for receiving return signals from any one of the actuated seats to manage the actuated seats from the projection room, the return signal including fault information data issued by one of the actuated seats; and
a motion simulation system having linear actuators each having an electric motor driving an output shaft, the output shafts of the linear actuators directly connected to some of the seats to move the seats and interfaced to the projection system centrally sending motion data signals to cause individual motion of each said seats so as to remotely and individually send motion data signals to the electric motors of the electrically-powered linear actuators of the seats in synchronization with a feature-length motion picture being projected on the screen as a function of said access data, so as to provide movement to the portion of seats in synchronization with the feature-length motion picture.

7. The screening room according to claim 6, further comprising a user interface for each said actuated seat to control access to the actuated seat.

8. The screening room according to claim 7, wherein the user interface has an intensity control function to adjust the intensity of the movement of each of the actuated seat individually.

9. The screening room according to claim 6, wherein the actuated seats are separated in first and second categories of actuated seats, the actuated seats of the first category being one-person seats and the actuated seats of the second category being seats for at least two persons.

10. The screening room according to claim 6, wherein the actuated seats are regrouped in a limited-access zone of the movie theater.

11. The screening room according to claim 6, wherein the actuated seats are each provided with a seated-position adjustment mechanism.

12. The screening room according to claim 6, wherein the motion signals are encoded with a sound signal of the motion picture.

13. The screening room according to claim 12, wherein the sound signal is the existing sound signal of the motion picture.

14. A method for operating seats in a first screening room of a movie theater, the seats being actuatable to provide movement in synchronization with video images of a sporting event being projected in the first screening room, comprising the steps of:
operating a control interface centrally controlling a plurality of the actuated seats individually;
centrally receiving access data confirming that access is sold for a portion of said seats;
selectively actuating said portion of the seats from said access data with centrally-sent motion signals while said sporting event is projected in the first screening room, the centrally-sent motion signals causing only said actuated portion of said seats to be individually actuated by electrically-operated linear actuators connected directly to the actuated seats to provide movement in synchronization with the video images of the sporting event;
selectively non-actuating a remainder of said seats with said centrally-sent motion signals while said motion picture is projected based on said centrally received access data; and
centrally receiving management signals from any individual one of the actuated seats on the control interface to confirm actuation of said portion of said seats, the management signals including fault information data issued by the individual one of the actuated seat.

15. The method according to claim 1, further comprising freezing motion of the one of the actuated seat by central command upon centrally receiving fault information data.

16. The screening room according to claim 6, wherein the control interface freezes motion of the individual one of the actuated seat by central command upon centrally receiving fault information data.

17. The screening room according to claim 14, wherein freezing motion of the one of the actuated seat by central command upon centrally receiving fault information data.

18. The method according to claim 1, wherein centrally receiving management signals further includes centrally receiving management signals from any one of the remainder of the seats that are non-actuated.

19. The method according to claim 1, wherein selectively actuating and selectively non-actuating seats includes actuating all seats with motion signals before a feature-length presentation of said motion picture, and restricting actuation to said portion of the seats during the feature-length presentation.

* * * * *